United States Patent
Putman

(10) Patent No.: US 6,379,582 B1
(45) Date of Patent: Apr. 30, 2002

(54) CROSSLINKED CO-POLYMER COMPOSITION FOR THERMAL ENERGY STORAGE

(75) Inventor: Jimmy W. Putman, Monroe, LA (US)

(73) Assignee: Magic Ice, Inc., Bastrop, LA (US)

( * ) Notice: Subject to any disclaimer, the term of this patent is extended or adjusted under 35 U.S.C. 154(b) by 0 days.

(21) Appl. No.: 09/536,678

(22) Filed: Mar. 28, 2000

(51) Int. Cl.⁷ .................................................. C09K 5/02
(52) U.S. Cl. ....................... 252/70; 252/75; 165/104.12; 165/104.21
(58) Field of Search ....................... 252/70, 75; 106/13; 165/104.12, 104.21

(56) References Cited

U.S. PATENT DOCUMENTS

| | | | |
|---|---|---|---|
| 2,166,113 A | 7/1939 | Bedford | 426/68 |
| 3,940,356 A | 2/1976 | Byrnes | 106/13 |
| 3,980,070 A | 9/1976 | Krupa | 126/263 |
| 4,744,913 A | 5/1988 | Salvador et al. | 252/70 |
| 5,118,434 A | 6/1992 | Meyer et al. | 252/70 |
| 5,423,996 A | 6/1995 | Salyer | 252/70 |
| 5,552,075 A | 9/1996 | Salyer | 252/70 |
| 5,650,090 A | 7/1997 | Salyer | 252/70 |
| RE35,586 E | 8/1997 | Manker | 126/263.03 |
| 5,697,961 A | 12/1997 | Kiamil | 607/108 |
| 5,723,063 A | 3/1998 | Jie | 252/70 |

*Primary Examiner*—Anthony Green
(74) *Attorney, Agent, or Firm*—Richard C. Litman

(57) ABSTRACT

The invention is a composition for thermal energy storage in heating or cooling items. The composition includes a crosslinked alkali metal polyacrylamide or polyacrylate/polyacrylamide copolymer. The alkali metal may be potassium or sodium, preferably potassium. The copolymer has a particle size of at least 1500 microns, preferably 2000–4000 microns. The composition includes water with its pH adjusted to 6.0 to 7.0. The composition also includes propylene glycol. An antimicrobial agent is included to prevent degradation due to microbial growth. A coloring agent may also be added. The composition has the appearance of crushed ice.

15 Claims, No Drawings

CROSSLINKED CO-POLYMER COMPOSITION FOR THERMAL ENERGY STORAGE

BACKGROUND OF THE INVENTION

1. Field of the Invention

The present invention relates to compositions usable for slowing temperature change in an object. The compositions may be used in heat/cold packs or loose around the object to be cooled or warmed.

2. Description of the Related Art

The drawbacks of ice for cooling food, beverages, injured areas of the body, and other items are well known. Ice can be used either crushed or in blocks of various sizes. Since all ice melts, it generally is used in a waterproof container. Alternatively, arrangements can be made to avoid damage due to dripping water, such as using the ice only outdoors or using a drainage system to carry away the drips. The melting water can damage food items unless they are protected by waterproof containers. For example, sandwiches cooled with ice in an ice chest must either be sealed in waterproof containers, or arrangements made to keep them away from direct contact with the melting water. The alternative is soggy sandwiches.

Crushed ice conforms to the shape of an object to be cooled, assuring close contact and rapid cooling of the object. However, crushed ice tends to melt rapidly, particularly if the ambient temperature is high, and must be replenished often.

Liquid gel packs or "blue ice" are well known as an ice substitute. These gel packs are reusable and avoid some of the drawbacks of ice. At temperatures above the freezing point of the gel, the gel is a viscous liquid. When placed in a freezer, gel packs freeze in a solid block.

If the gel pack is accidentally punctured or torn, the gel will leak when its temperature rises above the freezing point of the gel. For this reason, most gel packs use a rugged plastic bag or container, often made of a multilaminated plastic. Such containers are expensive to manufacture and can be bulky. If despite these precautions the liquid does leak, cleaning up afterward is often a difficult and messy task.

Some gel packs can be heated as well as cooled. Such packs can be used for hot or cold therapy. They are also useful for keeping hot food items hot, in addition to keeping cold items cold.

Crosslinked potassium polyacrylamide and polyacrylate/polyacrylamide copolymers are well known for agricultural purposes. When used as a soil additive, the granules of the copolymer absorb large amounts of water. The plant roots tap into the absorbed water for their water needs. Such copolymers can be damaged by exposure to sunlight, both by direct dehydration and by the destruction of the polymer backbone by UV light. Since soil additives are by their nature used beneath the surface of the ground, sun exposure is rarely a problem. The copolymer does not fully hydrate under soil conditions due to several factors, particularly pH.

U.S. Pat. No. 5,723,063 to Jie teaches a colloidal composition for use in cold packs. The composition contains water, salt, glycerine, and polyacrylamide. The preferred salts chlorides, sulfates, and sulfites.

U.S. Pat. No. 3,940,356 to Byrnes discloses ice release agents formulated from an alkylene glycol, water, an alkanol, and a salt of crosslinked polyacrylic acid. The alkylene glycol may be propylene glycol. The ratio of glycol to water ranges from 40:60 to 60:40.

U.S. Pat. No. Re. 35,586 to Manker discloses reusable warmers which include a flexible container. The flexible container contains a supercooled salt solution, an activator for initiating crystallization of the salt solution, and a gelling agent. The warmers generate heat when the container is flexed to activate the warmer. The composition holds its temperature well once the heat is generated. The warmer can also be used as a cold pack by placing in a refrigerator. The gelling agent may be any of a large number of gelling agents, including polyacrylates and polyacrylamides.

U.S. Pat. No. 2,166,113 to Bedford discloses a non-cracking ice composition for glazing of frozen fish, containing water and benzoic acid or hydrochloric acid.

U.S. Pat. No. 3,980,070 to Krupa teaches a heating pack which produces heat when water is added. The heating pack has a granular chemical composition which includes ferrous metal and an oxidizing agent. The composition preferably includes 15–40% citric acid.

U.S. Pat. No. 4,744,913 to Salvador et al. teaches a de-icing and anti-icing agent for aircraft and is herein incorporated by reference. The agent includes 40–70% of an alkylene glycol. The agent includes as a thickener two crosslinked acrylic polymers, which may be crosslinked alkali metal acrylate/acrylamide copolymer in a ratio by weight of 2 to 10:1. Sodium acrylate or potassium acrylate may be used. Water is preferred for polymerizing the acrylate. The acrylamide is polymerized in the presence of a free-radical initiator and a crosslinking agent in a water-miscible alcohol.

U.S. Pat. No. 5,118,434 to Meyer et al. teaches antifreeze fluids for heat-transfer applications and deicing fluids for aircraft, and is herein incorporated by reference. The fluids are glycol based and include a polymeric additive, such as acrylate, to prevent precipitation of salts.

U.S. Pat. Nos. 5,423,996, 5,552,075, and 5,650,090 to Salyer disclose compositions for thermal energy storage or thermal energy generation, including a silica matrix containing a water/urea phase change material. The thermal energy storage composition can be used as "blue ice" for cold packs or food storage.

None of the above inventions and patents, taken either singularly or in combination, is seen to describe the instant invention as claimed. Thus a crosslinked polyacrylamide or polyacrylate/polyacrylamide co-polymer composition for heating and cooling solving the aforementioned problems is desired.

SUMMARY OF THE INVENTION

The invention is a composition for thermal energy storage in heating or cooling items. The composition includes a crosslinked alkali metal polyacrylamide or polyacrylate/polyacrylamide copolymer. The alkali metal may be potassium or sodium, preferably potassium. The copolymer has a particle size of at least 1500 microns, preferably 2000–4000 microns. The composition includes water with its pH adjusted to 6.0 to 7.0. The composition also includes propylene glycol. An antimicrobial agent is included to prevent degradation due to microbial growth. A coloring agent may also be added. The composition has the appearance of crushed ice and may be used either loosely around an item or sealed in a flexible pack.

Accordingly, it is a principal object of the invention to produce a composition for thermal energy storage which has the appearance of crushed ice and can be used for either heating or cooling applications.

It is an object of the invention to provide improved elements and arrangements thereof for the purposes described which is inexpensive, dependable and fully effective in accomplishing its intended purposes.

This and other objects of the present invention will become readily apparent upon further review of the following specification.

DETAILED DESCRIPTION OF THE PREFERRED EMBODIMENTS

The present invention is a composition for thermal energy storage which has the appearance of crushed ice. The composition includes a crosslinked alkali metal polyacrylamide or polyacrylate/polyacrylamide copolymer, and a humectant to hydrate the copolymer. The humectant includes water having a pH ranging from 6.0 to 7.0; propylene glycol; and an antimicrobial agent.

The alkali metal may be either potassium or sodium. Potassium polyacrylamide or polyacrylate/polyacrylamide copolymer is preferred because of its excellent heat and cold retention. Due to its agricultural usage, potassium polyacrylamide or polyacrylate/polyacrylamide copolymer is also readily available and inexpensive. Sodium polyacrylate/polyacrylamide copolymer is not suitable for use in agriculture, due to the sodium content.

The copolymer has a particle size of at least 1500 microns. Preferably the particle size is at least 1800 microns. Ideally the particle size ranges from 2000 to 4000 microns. A suitable copolymer having this particle size is Stockhausen AP 35-K24 copolymer, distributed by Emerging Technologies, Inc. The copolymer is a polyacrylate polymer crosslinked with polyacrylamide, or a crosslinked copolymer of acrylamide and acrylate salts. A suitable copolymer with polyacrylamide alone is available from Cytec Industries. The usable pH range for the copolymer (not the humectant) is 5.0–9.0. The absorption rate and retention of the copolymer will vary depending on the exact chemistry of the copolymer used.

The composition is essentially non-toxic. Depending on the exact chemistry of the copolymer and the conditions under which it is hydrated, the polyacrylamide component of the copolymer may contain a trace (0.5%) of the toxic acrylamide monomer. The remainder of the copolymer is non-toxic. The other ingredients of the composition are preferably food grade or pharmaceutical grade. Since at most only a trace amount of the copolymer is toxic, and the copolymer is a small percentage of the final composition, the overall composition can be considered non-toxic.

The potassium polyacrylamide or polyacrylate/polyacrylamide copolymer will support the growth of microbes, including bacteria, algae, molds, mildew, yeasts, and other fungi. Microbe growth is aesthetically unattractive and produces unpleasant odors. Microbe growth also damages the copolymer and reduces its effectiveness for thermal energy storage. The antimicrobial agent is important to prevent microbe growth. The antimicrobial agent should be food or pharmaceutical grade. The antimicrobial agent is preferably a potassium salt of 2,4-hexadienoic acid, or $C_3H_7$ propyl p-hydroxybenzoate. These compounds produce excellent results in limiting microbial growth in the composition, and are readily available in food grade. A mixture of the two compounds may be used. The effectiveness of the antimicrobial agent lessens over a long period of time, so that the composition will eventually biodegrade if discarded.

The pH of the water must be carefully controlled from 6.0 to 7.0 so that the copolymer is adequately hydrated. If distilled or purified water is available having this pH, it may be used. However, purified water is generally expensive. Tap water generally has a pH which is too alkaline to produce acceptable results. A food or pharmaceutical grade acidifier may be used for adjusting the pH of the water. The acidifier is preferably citric acid, which performs well. Alternatively, muriatic acid may be used. If the water is overly acidic, soda ash may be used to adjust the pH.

Propylene glycol is added to lower the freezing point of the composition. Propylene glycol is readily available in food grade.

The composition is easily prepared by mixing the water, the propylene glycol, and the antimicrobial agent in a suitable container. The acidifier may be added if necessary to adjust the pH to the range of 6.0 to 7.0. The granules of the copolymer are then mixed in and allowed to hydrate. About 12 hours is adequate to achieve full hydration. Agitation of the composition during the hydration process will shorten this period. Hydration may also be speeded up by gentle heating of the humectant.

The resulting particles of the composition have a crystalline appearance similar to the ice crystals of crushed ice. A small amount of a blue coloring agent may be added to the composition if desired to enhance the appearance of the composition. The composition is very stable and can be reused many times. It will break down if exposed to bright sunlight for a long period or if it is heated to a high temperature, such as 100° C. The addition of a coloring agent also helps to prevent degradation due to light exposure.

Preferably the copolymer is 1–2% by weight of the composition, with 1.5% being most preferred. The water is 60–85%, preferably about 73%. The propylene glycol is 15–30%, preferably about 25%.

The antimicrobial agent is 0.02–0.08%, preferably about 0.05%. For typical tap water 0.1–0.4%, or preferably about 0.25% by weight, of citric acid produces an acceptable pH.

EXAMPLE

The composition was prepared using: crosslinked potassium polyacrylate/polyacrylamide copolymer, 1.5% by weight of the composition; water, 73.2%; propylene glycol, 25.0%; antimicrobial agent (either 2,4-hexadienoic acid or propyl p-hydroxybenzoate), 0.05%. 0.25% by weight of citric acid was used to control the pH. 0.01% of Adams Blue 1 and Red 40 Coloring was added to the humectant.

The resulting composition looks like crushed ice. If cooled in a freezer, it works like crushed ice. It will not melt as crushed ice will. The composition stays soft and pliable. Since the composition is a solid even at fairly high ambient temperatures, it will not leak. The composition can be reused many times. If spilled, it can be easily cleaned up with a broom or a vacuum cleaner. The composition is non-toxic and safe. It is biodegradable and will not harm the environment. The composition is also inexpensive to produce.

The composition has good heat and cold retention, better than that of liquid gel packs. The resistance to temperature change is provided largely by the humectant. The large particle size of the copolymer provides a solid matrix which holds the liquid in place and prevents convection. Smaller particle sizes absorb less water, allow more convection and more heat loss.

The composition has many uses. If an item to be cooled or heated is wrapped or in a container, the composition can be used loosely around the item. Since it can be conform to the shape of an item, the composition can serve both as a cushioning material for shipping and to keep the item cool. For example, it can be used for shipping pharmaceuticals which require refrigeration through the mail. It can be used in place of dry ice for shipping wrapped frozen food through the mail.

The composition preferably is sealed in a plastic bag and used as a hot or cold pack. The pack remains flexible at low temperatures such as −10 or −15° F. Such a pack can be used in an ice chest for keeping food and beverage cans cool. Food which would be ruined by contact with water can be kept cool and dry, without any need for waterproof containers. A pack can be used in a diaper bag pocket to keep formula cold. Since the pack is flexible, it works well as a cold pack for "icing" injuries. The same composition can be gently heated in a microwave oven or otherwise and used for heat therapy or for keeping food hot.

Since the composition will not leak if the bag is punctured, only a thin plastic bag is required as a container. Due to the attractive appearance of the composition, the plastic bag is preferably composed of clear plastic film. A variety of films may be used. Ideally the plastic bag is composed of clear polyethylene film; clear nylon may also be used. A suitable film is sold under the brand name Surlyn, available from DuPont.

Also part of the invention is a method of slowing temperature change in an object, using the composition as described above. The method includes a step of selecting at least one object to be cooled or heated. The temperature of the composition is adjusted to an initial composition temperature. This is selected to slow the rate of change of the object temperature under the predicted conditions, such as within an insulated chest. For example, the composition may be placed in a freezer for equilibration to the desired initial composition temperature. Once that is reached, the composition is placed in contact with the object for a period of time, so that the rate of change of the object temperature is slowed. The object temperature may be either below or above the ambient temperature.

It is to be understood that the present invention is not limited to the embodiments described above, but encompasses any and all embodiments within the scope of the following claims.

I claim:

1. A composition for thermal energy storage, the composition comprising:

about 1–2% by weight of a crosslinked alkali metal copolymer selected from the group consisting of a potassium polyacrylamide copolymer, a sodium polyacrylamide copolymer, a potassium polyacrylate/polyacrylamide copolymer and a sodium polyacrylate/polyacrylamide copolymer, the alkali metal copolymer having a particle size of at least 1500 microns;

about 60–85% by weight of water having a pH ranging from 6.0 to 7.0;

about 15–30% by weight of propylene glycol; and an effective amount of an antimicrobial agent to prevent microbe growth.

2. The composition according to claim 1, wherein the alkali metal copolymer is a potassium polyacrylate/polyacrylamide copolymer.

3. The composition according to claim 2, wherein the particle size of the alkali metal copolymer ranges from 2000 to 4000 microns.

4. The composition according to claim 1, wherein the alkali metal copolymer is a potassium polyacrylamide copolymer.

5. The composition according to claim 3, further comprising a coloring agent.

6. The composition according to claim 3, wherein the antimicrobial agent includes a potassium salt of 2,4-hexadienoic acid.

7. The composition according to claim 3, wherein the antimicrobial agent includes $C_3H_7$ propyl p-hydroxybenzoate.

8. The composition according to claim 3, further comprising an acidifier for adjusting the pH of the water.

9. The composition according to claim 8, wherein the acidifier is citric acid.

10. The composition according to claim 1, wherein the alkali metal copolymer is about 1.5% by weight of the composition, the water is about 73% by weight of the composition, the propylene glycol is about 25% by weight of the composition, and the antimicrobial agent is about 0.05% by weight of the composition.

11. The composition according to claim 10, wherein the antimicrobial agent includes at least one compound selected from the group consisting of 2,4-hexadienoic acid and propyl p-hydroxybenzoate.

12. A method of slowing temperature change in an object, comprising the steps of:

(a) preparing a composition comprising:
      (1) a crosslinked potassium copolymer selected from the group consisting of a potassium polyacrylamide copolymer and a potassium polyacrylate/polyacrylamide copolymer, the potassium copolymer having a particle size of at least 1500 microns, the copolymer being 1–2% by weight of the composition;
      (2) water having a pH ranging from 6.0 to 7.0, the water being 60–85% by weight of the composition;
      (3) propylene glycol, the propylene glycol being 15–30% by weight of the composition; and
      (4) an antimicrobial agent, the antimicrobial agent being 0.02–0.08% by weight of the composition;

(b) selecting at least one object, the object having an object temperature;

(c) adjusting the temperature of the composition to an initial composition temperature, the initial composition temperature being selected to slow the rate of change of the object temperature; and (d) placing the composition in contact with the object for a period of time, so that the rate of change of the object temperature is slowed.

13. The method of claim 12, further comprising a step of sealing the composition within a plastic bag prior to step (c).

14. The method of claim 12, wherein the plastic bag is composed of clear polyethylene film.

15. The method of claim 12, wherein the object temperature is below ambient temperature.

* * * * *